(12) United States Patent
Granger-Jones et al.

(10) Patent No.: US 10,187,090 B2
(45) Date of Patent: Jan. 22, 2019

(54) RADIO FREQUENCY FILTERING CIRCUITRY FOR CARRIER AGGREGATION

(71) Applicant: Qorvo US, Inc., Greensboro, NC (US)

(72) Inventors: Marcus Granger-Jones, Scotts Valley, CA (US); Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 153 days.

(21) Appl. No.: 15/432,357

(22) Filed: Feb. 14, 2017

(65) Prior Publication Data

US 2017/0237452 A1    Aug. 17, 2017

Related U.S. Application Data

(60) Provisional application No. 62/295,285, filed on Feb. 15, 2016.

(51) Int. Cl.
*H04B 1/00* (2006.01)

(52) U.S. Cl.
CPC .................... *H04B 1/0057* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,379,294 | A * | 1/1995 | Ohtake | H04L 5/14 333/173 |
| 8,416,758 | B1 * | 4/2013 | Rousu | H04B 1/18 370/343 |
| 8,457,685 | B1 * | 6/2013 | Bauder | H04B 1/18 455/553.1 |
| 2014/0073268 | A1 * | 3/2014 | Taniuchi | H01P 1/10 455/83 |
| 2016/0233895 | A1 * | 8/2016 | Khlat | H04B 1/0064 |
| 2017/0005639 | A1 | 1/2017 | Khlat et al. | |

* cited by examiner

*Primary Examiner* — Junpeng Chen
(74) *Attorney, Agent, or Firm* — Withrow & Terranova, P.L.L.C.

(57) ABSTRACT

Radio frequency (RF) filtering circuitry includes a number of filtering elements and switching circuitry configured to rearrange the filtering elements between a common node, a first input/output node, a second input/output node, and a third input/output node such that the RF filtering circuitry is capable of supporting carrier aggregation between RF signals within a first RF frequency band and RF signals within a second RF frequency band, as well as between RF signals within a first portion of the second RF frequency band and a second portion of the second RF frequency band.

20 Claims, 3 Drawing Sheets

RADIO FREQUENCY FILTERING CIRCUITRY FOR CARRIER AGGREGATION

RELATED APPLICATIONS

This application claims the benefit of provisional patent application Ser. No. 62/295,285, filed Feb. 15, 2016, the disclosure of which is hereby incorporated herein by reference in its entirety.

FIELD OF THE DISCLOSURE

The present disclosure relates to radio frequency (RF) front end circuitry suitable for one or more carrier aggregation modes. Specifically, the present disclosure relates to RF filtering circuitry within RF front end circuitry capable of supporting multiple carrier aggregation modes with minimal insertion loss and area.

BACKGROUND

As wireless communications technology continues to evolve, there is a focus on improving both reliability and speed. In recent years, technologies such as multiple-input-multiple-output (MIMO) and carrier aggregation have been used to increase both speed and reliability of a wireless connection. At a high level, MIMO and carrier aggregation allow multiple radio frequency (RF) signals to be simultaneously transmitted and/or received by a device. These RF signals are generally transmitted at different frequencies and then separated by a receiving device to obtain the data therein. While this process is relatively straightforward when the frequencies of the RF signals are far apart, it becomes significantly more complex when they are not. This is due to the RF front end circuitry that is responsible for separating the received RF signals. Accordingly, FIG. 1 shows conventional RF front end circuitry 10. The conventional RF front end circuitry 10 includes an antenna 12, a triplexer 14, first band filtering circuitry 16, second band filtering circuitry 18, and third band filtering circuitry 20. The triplexer 14 is coupled between the first band filtering circuitry 16, the second band filtering circuitry 18, and the third band filtering circuitry 20. Control circuitry 22 may be coupled to the first band filtering circuitry 16, the second band filtering circuitry 18, and the third band filtering circuitry 20 to control one or more aspects of the operation thereof.

The triplexer 14 is configured to separate RF receive signals within a first RF frequency band, RF receive signals within a second RF frequency band, and RF receive signals within a third RF frequency band, separately delivering the RF receive signals within the first RF frequency band to the first band filtering circuitry 16, the RF receive signals within the second RF frequency band to the second band filtering circuitry 18, and the RF receive signals within the third RF frequency band to the third band filtering circuitry 20. Further, the diplexer 14 is configured to combine RF transmit signals within the first RF frequency band, the second RF frequency band, and the third RF frequency band received from the first band filtering circuitry 16, the second band filtering circuitry 18, and the third band filtering circuitry 20 together, delivering the RF transmit signals to the antenna 12 for transmission therefrom.

The first band filtering circuitry 16 is configured to isolate RF receive signals within the first RF frequency band into one or more RF operating bands therein, separately delivering the isolated RF receive signals to different ones of a first set of input/output nodes 24. Further, the first band filtering circuitry 16 is configured to combine RF transmit signals within one or more RF operating bands of the first RF frequency band together, providing these combined RF transmit signals to the triplexer 14 for transmission from the antenna 12. The first band filtering circuitry 16 may include a number of filters configured to perform the above mentioned tasks, as well as switching circuitry for appropriately routing signals between the triplexer 14 and these filters. Further, the first band filtering circuitry 16 may include a number of low-noise amplifiers (LNAs) and power amplifiers (PAs) for amplifying the RF receive signals and RF transmit signals, respectively, as required.

The second band filtering circuitry 18 is configured to isolate RF receive signals within the second RF frequency band into one or more RF operating bands therein, separately delivering the isolated RF receive signals to different ones of a second set of input/output nodes 26. Further, the second band filtering circuitry 18 is configured to combine RF transmit signals within one or more RF operating bands of the second RF frequency band together, providing these combined RF transmit signals to the triplexer 14 for transmission from the antenna 12. The second band filtering circuitry 18 may include a number of filters configured to perform the above mentioned tasks, as well as switching circuitry for appropriately routing signals between the triplexer 14 and these filters. Further, the second band filtering circuitry 18 may include a number of LNAs and PAs for amplifying the RF receive signals and RF transmit signals, respectively, as required.

The third band filtering circuitry 20 is configured to isolate RF receive signals within the third RF frequency band into one or more RF operating bands therein, separately delivering the isolated RF receive signals to different ones of a third set of input/output nodes 28. Further, the third band filtering circuitry 20 is configured to combine RF transmit signals within one or more RF operating bands of the third RF frequency band together, providing these combined RF transmit signals to the triplexer 14 for transmission from the antenna 12. The third band filtering circuitry 20 may include a number of filters configured to perform the above mentioned tasks, as well as switching circuitry for appropriately routing signals between the triplexer 14 and these filters. Further, the third band filtering circuitry 20 may include a number of LNAs and PAs for amplifying the RF receive signals and the RF transmit signals, respectively, as required.

Using the conventional RF front end circuitry 10, carrier aggregation and/or MIMO may be accomplished between RF signals within the first RF frequency band and RF signals within the second RF frequency band, RF signals within the first RF frequency band and RF signals within the third RF frequency band, and RF signals within the second RF frequency band and RF signals within the third RF frequency band. The first RF frequency band may be a mid-band encompassing frequencies between 1700 MHz and 2200 MHz. The second RF frequency band may be a high-band encompassing frequencies between 2300 MHz and 2700 MHz, and the third RF frequency band may be a low-band encompassing frequencies between 700 MHz and 1000 MHz. The relatively large separation between the third RF frequency band and both the first RF frequency band and the second RF frequency band generally makes RF signals in these RF frequency bands easy to separate. However, as discussed above, there may be a much smaller separation between the first RF frequency band and the second RF frequency band. This significantly complicates the design of the triplexer 14 and makes it very difficult to provide adequate separation between signals within the first RF frequency band and signals within the second RF f band while maintaining other performance characteristics such as low insertion loss. Additionally, the conventional RF front end circuitry 10 is not able to separate RF signals within any of the first RF frequency band, the second RF frequency band, and the third RF frequency band and thus cannot perform carrier aggregation and/or MIMO using separate signals within these bands.

In light of the above, there is a need for RF front end circuitry with improved RF filtering circuitry for supporting additional carrier aggregation configurations while maintaining desirable performance thereof.

SUMMARY

The present disclosure relates to radio frequency (RF) front end circuitry suitable for one or more carrier aggregation modes. Specifically, the present disclosure relates to RF filtering circuitry within RF front end circuitry capable of supporting multiple carrier aggregation modes with minimal insertion loss and area. RF filtering circuitry includes a first filtering element, a second filtering element, a third filtering element, a fourth filtering element, switching circuitry, and control circuitry. The first filtering element is configured to pass RF signals within a first RF frequency band while attenuating RF signals within a second RF frequency band. The second filtering element is configured to pass RF signals within a first portion of the second RF frequency band while attenuating RF signals within the first RF frequency band and RF signals within a second portion of the second RF frequency band. The third filtering element is configured to attenuate RF signals within the second portion of the second RF frequency band while passing RF signals within the first RF frequency band and RF signals within the first portion of the second RF frequency band. The fourth filtering element is configured to pass RF signals within the second portion of the second RF frequency band while attenuating RF signals within the first RF frequency band and RF signals within the first portion of the second RF frequency band. The switching circuitry is coupled between a common node, a first input/output node, a second input/output node, a third input output node, the first filtering element, the second filtering element, the third filtering element, and the fourth filtering element. In a first carrier aggregation mode, the control circuitry is configured to operate the switching circuitry such that the first filtering element is coupled between the common node and the first input/output node and the second filtering element is coupled between the common node and the second input/output node. In a second carrier aggregation mode, the control circuitry is configured to operate the switching circuitry such that the third filtering element is coupled between the common node and the first input/output node and the fourth filtering element is coupled between the common node and the second input/output node. In a third carrier aggregation mode, the control circuitry is configured to operate the switching circuitry such that the third filtering element is coupled between the common node and the third input/output node and the fourth filtering element is coupled between the common node and the second input/output node.

By providing the filtering elements and switches and operating them as discussed above, the RF filtering circuitry is capable of supporting carrier aggregation between RF signals within the first RF frequency band and RF signals within the second RF frequency band, as well as between RF signals within the first portion of the second RF frequency band and RF signals within the second portion of the second RF frequency band.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
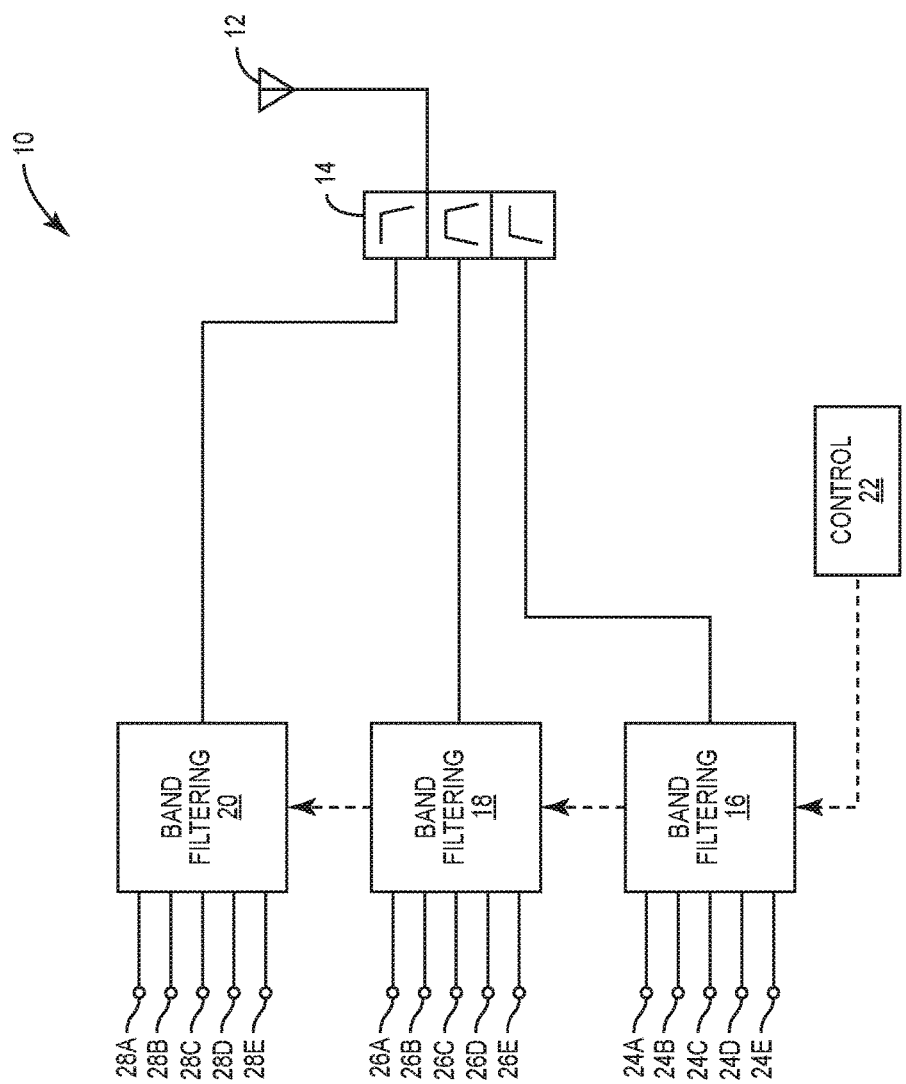
FIG. 1 is a functional schematic illustrating conventional radio frequency (RF) front end circuitry.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
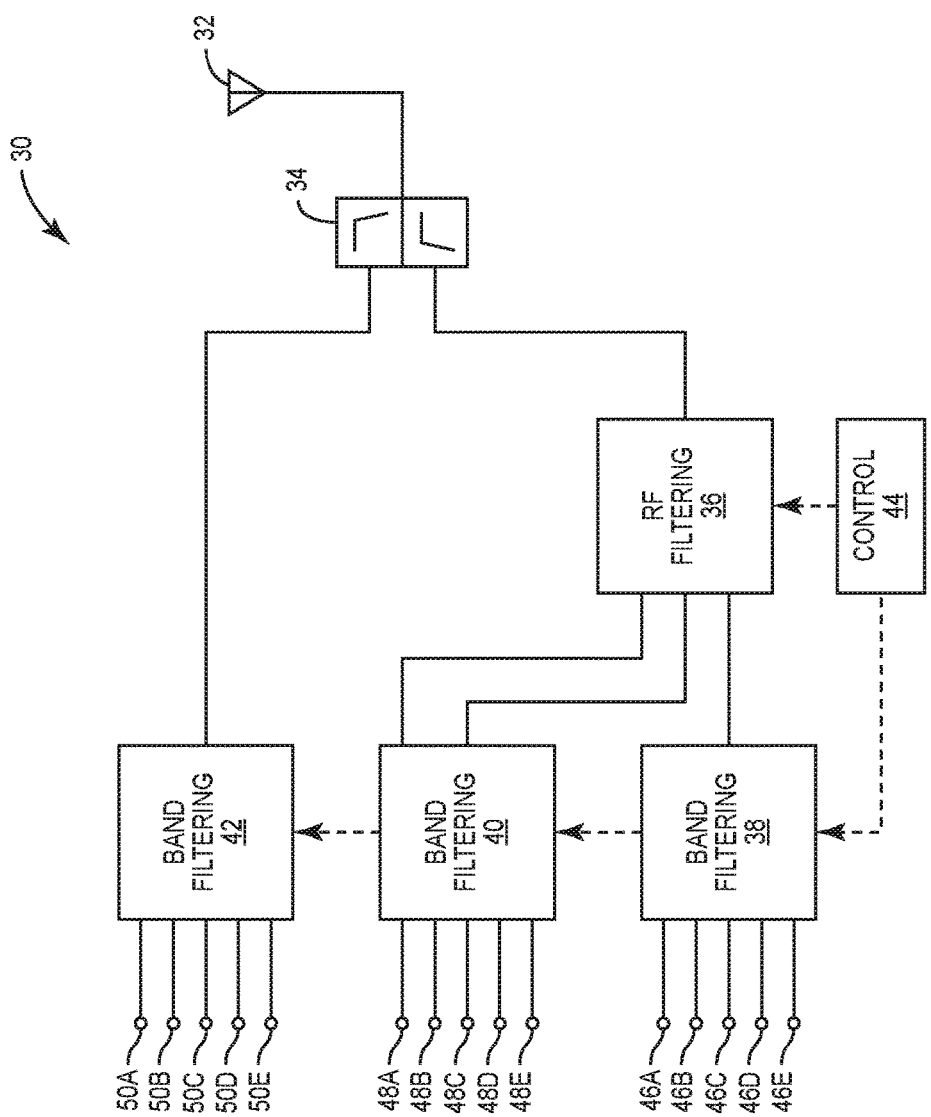
FIG. 2 is a functional schematic illustrating RF front end circuitry according to one embodiment of the present disclosure.

FIG. 2 shows radio frequency (RF) front end circuitry 30 according to one embodiment of the present disclosure. The RF front end circuitry 30 includes an antenna 32, a diplexer 34, RF filtering circuitry 36, first band filtering circuitry 38, second band filtering circuitry 40, and third band filtering circuitry 42. The diplexer 34 is coupled between the RF filtering circuitry 36, the third band filtering circuitry 42, and the antenna 32. The RF filtering circuitry 36 is coupled between the first band filtering circuitry 38, the second band filtering circuitry 40, and the diplexer 34. Control circuitry 44 may be coupled to the RF filtering circuitry 36, the first band filtering circuitry 38, the second band filtering circuitry 40, and the third band filtering circuitry 42 to control one or more aspects of the operation thereof.

The diplexer 34 is configured to separate RF receive signals within a first RF frequency band and a second RF frequency band from RF receive signals within a third RF frequency band, separately delivering the RF receive signals within the first RF frequency band and the second RF frequency band to the RF filtering circuitry 36 and the RF receive signals within the third RF frequency band to the third band filtering circuitry 42. Further, the diplexer 34 is configured to combine RF transmit signals within the first RF frequency band, the second RF frequency band, and the third RF frequency band from the RF filtering circuitry 36 and the third band filtering circuitry 42 together, delivering the RF transmit signals to the antenna 12 for transmission therefrom.

The RF filtering circuitry 36 is configured to separate RF receive signals within the first RF frequency band from RF receive signals within a first portion of the second RF frequency band and RF receive signals within a second portion of the second RF frequency band, separately delivering the RF receive signals within the first operating band to the first band filtering circuitry 38, the RF receive signals within the first portion of the second RF frequency band to the second band filtering circuitry 40, and the RF receive signals within the second portion of the second RF frequency band to the second band filtering circuitry 40. Further, the RF filtering circuitry 36 is configured to combine RF transmit signals within the first RF frequency band, the first portion of the second RF frequency band, and the second portion of the second RF frequency band from the first band filtering circuitry 38 and the second band filtering circuitry 40 together, delivering the RF transmit signals to the diplexer 34 for transmission from the antenna 32.

The first band filtering circuitry 38 is configured to isolate RF receive signals within the first RF frequency band into one or more RF operating bands therein, separately delivering the isolated RF receive signals to different ones of a first set of input/output nodes 46. Further, the first band filtering circuitry 38 is configured to combine RF transmit signals within one or more RF operating bands of the first RF frequency band together, providing these combined RF transmit signals to the RF filtering circuitry 36 for transmission from the antenna 32. The first band filtering circuitry 38 may include a number of filters configured to perform the above mentioned tasks, as well as switching circuitry for appropriately routing signals between the RF filtering circuitry 36 and these filters.

The second band filtering circuitry 40 is configured to isolate RF receive signals within the second RF frequency band into one or more RF operating bands therein, separately delivering the isolated RF receive signals to different ones of a second set of input/output nodes 48. Further, the second band filtering circuitry 40 is configured to combine RF transmit signals within one or more RF operating bands of the second RF frequency band together, providing these combined RF transmit signals to the RF filtering circuitry 36 for transmission from the antenna 32. The second band filtering circuitry 40 may include a number of filters configured to perform the above mentioned tasks, as well as switching circuitry for appropriately routing signals between the RF filtering circuitry 36 and these filters. Further, the second band filtering circuitry 40 may include a number of LNAs and PAs for amplifying the RF receive signals and RF transmit signals, respectively, as required.

The third band filtering circuitry 42 is configured to isolate RF receive signals within the third RF frequency band into one or more RF operating bands therein, separately delivering the isolated RF receive signals to different ones of a third set of input/output nodes 50. Further, the third band filtering circuitry 42 is configured to combine RF transmit signals within one or more RF operating bands of the third RF frequency band together, providing these combined RF transmit signals to the diplexer 34 for transmission from the antenna 32. The third band filtering circuitry 42 may include a number of filters configured to perform the above mentioned tasks, as well as switching circuitry for appropriately routing signals between the diplexer 34 and these filters. Further, the third band filtering circuitry 42 may include a number of LNAs and PAs for amplifying the RF receive signals and the RF transmit signals, respectively, as required.

As discussed herein, an RF frequency band is an arbitrary group of RF frequencies. Generally, these RF frequency bands represent relatively large portions of the wireless spectrum, such as a low-band, a mid-band, and a high-band. In one embodiment, the first RF frequency band is a mid-band encompassing frequencies between 1710 MHz and 2200 MHz, the second RF frequency band is a high-band encompassing frequencies between 2300 MHz and 2690 MHz, and the third RF frequency band is a low-band encompassing frequencies between 700 MHz and 960 MHz. Those skilled in the art will appreciate that these frequencies are merely exemplary, and that the principles of the present disclosure may be applied to any number of different RF frequency bands without departing from the principles of the present disclosure. An RF operating band is a specific group of RF frequencies used for transmission and reception of an RF signal. For example, there are a number of RF operating bands defined in the $3^{rd}$ Generation Partnership Project (3GPP) Long Term Evolution (LTE) standard 36.101, the contents of which are hereby incorporated by reference in their entirety. The first portion of the second RF frequency band may encompass frequencies between 2496 MHz and 2700 MHz, while the second portion of the second RF frequency band may encompass frequencies between 2300 MHz and 2400 MHz. Again, these frequency ranges are only exemplary. In various embodiments, the first portion of the second RF frequency band and the second portion of the second RF frequency band may overlap, or may encompass less of the second RF frequency band.

Notably, the RF signals within the first portion of the second RF frequency band and the RF signals within the second portion of the second RF frequency band are separately provided between the RF filtering circuitry 36 and the second band filtering circuitry 40. This is due to a special design of the RF filtering circuitry 36 discussed below, and enables carrier aggregation between the RF signals within the first portion of the second RF frequency band and RF signals within the second portion of the second RF frequency band in addition to carrier aggregation between RF signals within the first RF frequency band and RF signals within the second RF frequency band. This additional carrier aggregation mode comes at little to no cost in terms of performance of the RF front end circuitry 30 and area of the RF filtering circuitry 36.

Figure 3:
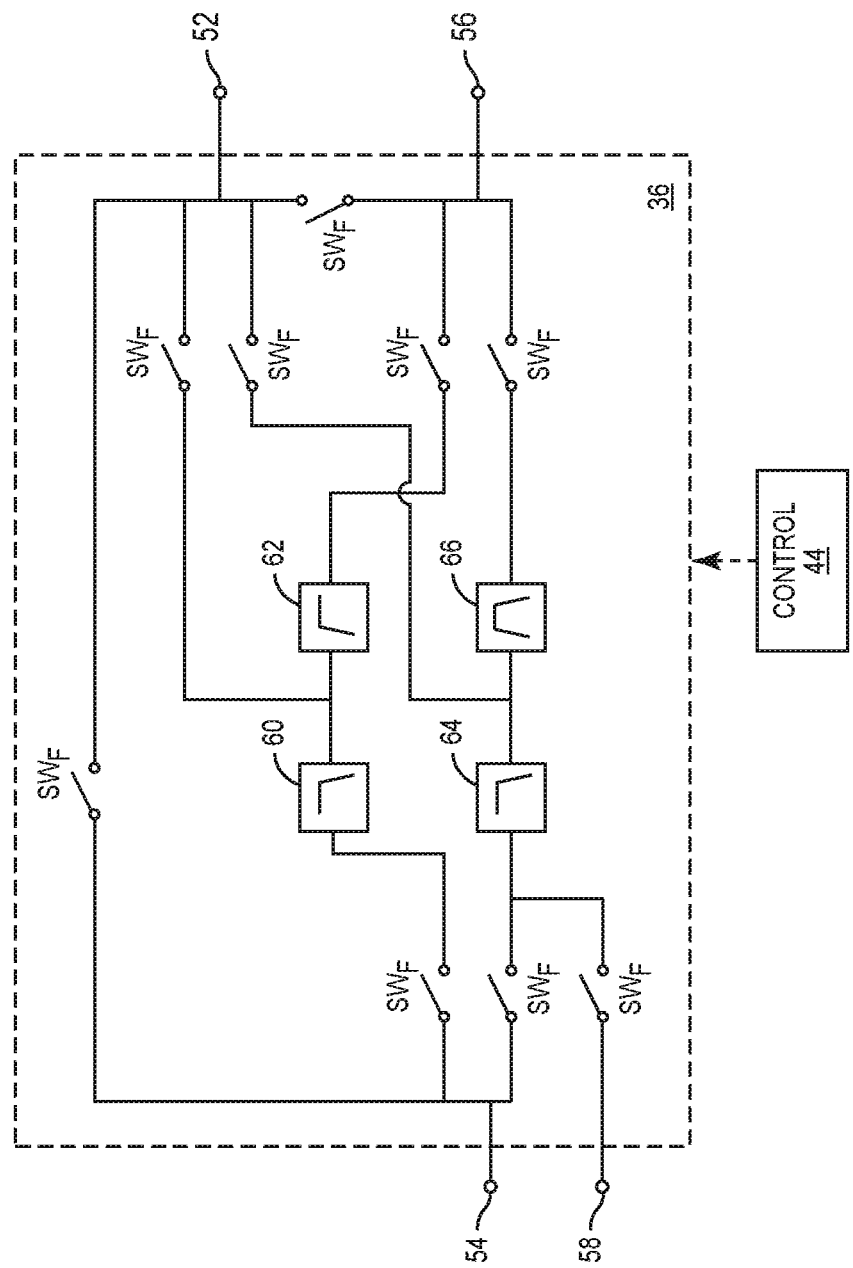
FIG. 3 is a functional schematic illustrating RF filtering circuitry according to one embodiment of the present disclosure.

Details of the RF filtering circuitry 36 are shown in FIG. 3 according to one embodiment of the present disclosure. For context, the control circuitry 44 is also shown. The RF filtering circuitry 36 includes a common node 52, a first input/output node 54, a second input/output node 56, a third input/output node 58, a first filtering element 60, a second filtering element 62, a third filtering element 64, a fourth filtering element 66, and a number of filter switches $SW_F$, which are coupled between the common node 52, the first input/output node 54, the second input/output node 56, the third input/output node 58, the first filtering element 60, the second filtering element 62, the third filtering element 64, and the fourth filtering element 66.

The first filtering element 60 is configured to pass RF signals within the first RF frequency band while attenuating signals within the second RF frequency band. The first filtering element 60 may therefore provide a bandpass filter response with a passband corresponding to the first RF frequency band, or a low-pass filter response with a cutoff frequency at or near the upper end of the first RF frequency band. The second filtering element 62 is configured to pass RF signals within a first portion of the second RF frequency band while attenuating RF signals within the first RF frequency band and RF signals within a second portion of the second RF frequency band. The second filtering element may therefore provide a bandpass filter response with a passband corresponding to the first portion of the second RF frequency band, or a high-pass filter response with a cutoff frequency at or near the lower end of the first portion of the second RF frequency band. The third filtering element 64 is configured to attenuate signals within the second portion of the second RF frequency band while passing RF signals within the first RF frequency band and RF signals within the first portion of the second RF frequency band. The third filtering element 64 may therefore provide a notch filter response or a bandstop filter response with a blocking band corresponding to the second portion of the second RF frequency band. The fourth filtering element 66 is configured to pass RF signals within the second portion of the second RF frequency band while attenuating RF signals within the first RF frequency band and RF signals within the first portion of the second RF frequency band. The fourth filtering element 66 may therefore provide a bandpass filter response with a passband corresponding to the second portion of the second RF frequency band.

In a first carrier aggregation configuration, the control circuitry 44 is configured to operate the RF filter switches $SW_F$ in order to couple the first filtering element 60 between the common node 52 and the first input/output node 54 and couple the second filtering element 62 between the common node 52 and the second input/output node 56. Accordingly, RF signals within the first RF frequency band may be separated from RF signals within the first portion of the second RF frequency band, thereby allowing carrier aggregation and/or MIMO between RF signals within these bands.

In a second carrier aggregation configuration, the control circuitry 44 is configured to operate the RF filter switches $SW_F$ in order to couple the third filtering element 64 between the common node 52 and the first input/output node 54 and couple the fourth filtering element 66 between the common node 52 and the second input/output node 56. Accordingly, RF signals within the first RF frequency band may be separated from RF signals within the second portion of the second RF frequency band, thereby allowing carrier aggregation and/or MIMO between RF signals within these bands.

In a third carrier aggregation configuration, the control circuitry 44 is configured to operate the RF filter switches $SW_F$ in order to couple the third filtering element 64 between the common node 52 and the third input/output node 58 and couple the fourth filtering element 66 between the common node 52 and the second input/output node 56. Accordingly, RF signals within the first portion of the second RF frequency band may be separated from RF signals within the second portion of the second RF frequency band, thereby allowing carrier aggregation and/or MIMO between RF signals within these bands.

By providing the third filtering element such that it attenuates RF signals within the second portion of the second RF frequency band while passing RF signals within the first RF frequency band and RF signals within the second portion of the second RF frequency band, and by arranging the filter switches $SW_F$ in order to allow for the connection of the first filtering element 60, the second filtering element 62, the third filtering element 64, and the fourth filtering element 66 as described above, the RF filtering circuitry 36 is able to support additional carrier aggregation and/or MIMO modes without the addition of any filters. As those skilled in the art will appreciate, this may result in significant area savings in the RF filtering circuitry 36 in addition to reduced insertion losses compared to conventional approaches that would normally require additional filtering elements to accomplish the same task.

Notably, both the second input/output node 56 and the third input/output node 58 will be connected to the second band filtering circuitry 40 as shown in FIG. 3. These separate connections allow for the separate delivery of RF signals within the first portion of the second RF frequency band and RF signals within the second portion of the second RF frequency band. Accordingly, these RF signals may be separately amplified by an LNA in the second band filtering circuitry 40 and delivered to different ones of the input/output ports 48 thereof for further processing.

In a non-carrier aggregation configuration, the control circuitry 44 is configured to operate the RF filter switches $SW_F$ in order to couple the common node 52 directly to one of the first input/output node 54 and the second input/output node 56. While not supported by the configuration of the filter switches $SW_F$ in FIG. 3, additional filter switches $SW_F$ may be added in various embodiments in order to enable a direct connection between the common node 52 and the third input/output node 58. In such a mode, RF signals in only one of the first RF frequency band and the second RF frequency band will be received. Accordingly, there is no need for separation of these signals, and the insertion loss associated with the filtering elements in the RF filtering circuitry 36 may therefore be avoided.

The first filtering element 60, the second filtering element 62, the third filtering element 64, and the fourth filtering element 66 may be any suitable type of filtering elements without departing from the principles of the present disclosure. For example, the first filtering element 60, the second filtering element 62, the third filtering element 64, and the fourth filtering element 66 may be surface acoustic wave (SAW) filters, bulk acoustic wave (BAW) filters, lumped element (LC) filters, or some combination thereof. Those skilled in the art will appreciate that there are many different filter technologies suitable for the filtering elements in the RF filtering circuitry 36, all of which are contemplated herein.

Those skilled in the art will recognize improvements and modifications to the preferred embodiments of the present disclosure. All such improvements and modifications are considered within the scope of the concepts disclosed herein and the claims that follow.

What is claimed is:

1. Radio frequency (RF) filtering circuitry comprising:
  a first filtering element configured to pass RF signals within a first RF frequency band while attenuating RF signals within a second RF frequency band;
  a second filtering element configured to pass RF signals within a first portion of the second RF frequency band while attenuating RF signals within the first RF frequency band and RF signals within a second portion of the second RF frequency band;
  a third filtering element configured to attenuate RF signals within the second portion of the second RF frequency band while passing RF signals within the first RF frequency band and RF signals within the first portion of the second RF frequency band;
  a fourth filtering element configured to pass RF signals within the second portion of the second RF frequency band while attenuating RF signals within the first RF frequency band and RF signals within the first portion of the second RF frequency band;
  switching circuitry coupled between a common node, a first input/output node, a second input/output node, a third input/output node, the first filtering element, the second filtering element, the third filtering element, and the fourth filtering element; and
  control circuitry coupled to the switching circuitry and configured to operate the switching circuitry such that:
    in a first carrier aggregation mode the first filtering element is coupled between the common node and the first input/output node and the second filtering element is coupled between the common node and the second input/output node;
    in a second carrier aggregation mode the third filtering element is coupled between the common node and the first input/output node and the fourth filtering element is coupled between the common node and the second input/output node; and
    in a third carrier aggregation mode the third filtering element is coupled between the common node and the third input/output node and the fourth filtering element is coupled between the common node and the second input/output node.

2. The RF filtering circuitry of claim 1 wherein the control circuitry is configured to operate the switching circuitry such that in a non-carrier aggregation mode, the common node is coupled directly to one of the first input/output node and the second input/output node.

3. The RF filtering circuitry of claim 2 wherein:
  the first filtering element provides a low-pass filter response;
  the second filtering element provides one of a high-pass filter response and a bandpass filter response;
  the third filtering element provides one of a notch filter response and a bandstop filter response; and
  the fourth filtering element provides one of a high-pass filter response and a bandpass filter response.

4. The RF filtering circuitry of claim 2 wherein:
  in the first carrier aggregation mode, the RF filtering circuitry is configured to isolate RF receive signals within the first RF frequency band from RF receive signals within the first portion of the second RF frequency band, separately delivering the RF receive signals within the first RF frequency band to the first input/output node and the RF receive signals within the first portion of the second RF frequency band to the second input/output node;
  in the second carrier aggregation mode, the RF filtering circuitry is configured to isolate RF receive signals within the first RF frequency band from RF receive signals within the second portion of the second RF frequency and, separately delivering the RF receive signals within the first RF frequency band to the first input/output node and the RF receive signals within the second portion of the second RF frequency band to the second input/output node; and
  in the third carrier aggregation mode, the RF filtering circuitry is configured to isolate RF receive signals within the first portion of the second RF frequency band from RF receive signals within the second portion of the second RF frequency band, separately delivering the RF receive signals within the first portion of the second RF frequency band to the third input/output node and the RF receive signals within the second portion of the second RF frequency band to the second input/output node.

5. The RF filtering circuitry of claim 4 wherein:
  the first filtering element provides a low-pass filter response;
  the second filtering element provides one of a high-pass and a bandpass filter response;
  the third filtering element provides a notch filter response; and
  the fourth filtering element provides one of a high-pass or a bandpass filter response.

6. The RF filtering circuitry of claim 4 wherein:
  the first RF frequency band includes the frequencies between 1700 MHz and 2200 MHz;

the first portion of the second RF frequency band includes the frequencies between 2496 MHz and 2700 MHz; and the second portion of the second RF frequency band includes the frequencies between 2300 MHz and 2400 MHz.

7. The RF filtering circuitry of claim 6 wherein:
the first filtering element provides a low-pass filter response;
the second filtering element provides one of a high-pass and a bandpass filter response;
the third filtering element provides one of a notch filter response and a bandpass filter response; and
the fourth filtering element provides one of a high-pass or a bandpass filter response.

8. The RF filtering circuitry of claim 1 wherein:
in the first carrier aggregation mode, the RF filtering circuitry is configured to isolate RF receive signals within the first RF frequency band from RF receive signals within the first portion of the second RF frequency band, separately delivering the RF receive signals within the first RF frequency band to the first input/output node and the RF receive signals within the first portion of the second RF frequency band to the second input/output node;
in the second carrier aggregation mode, the RF filtering circuitry is configured to isolate RF receive signals within the first RF frequency band from RF receive signals within the second portion of the second RF frequency band, separately delivering the RF receive signals within the first RF frequency band to the first input/output node and the RF receive signals within the second portion of the second RF frequency band to the second input/output node; and
in the third carrier aggregation mode, the RF filtering circuitry is configured to isolate RF receive signals within the first portion of the second RF frequency band from RF receive signals within the second portion of the second RF frequency band, separately delivering the RF receive signals within the first portion of the second RF frequency band to the third input/output node and the RF receive signals within the second portion of the second RF frequency band to the second input/output node.

9. The RF filtering circuitry of claim 1 wherein:
the first RF frequency band includes the frequencies between 1710 MHz and 2200 MHz;
the first portion of the second RF frequency band includes the frequencies between 2496 MHz and 2700 MHz; and
the second portion of the second RF frequency band includes the frequencies between 2300 MHz and 2400 MHz.

10. The RF filtering circuitry of claim 1 wherein:
the first filtering element provides a low-pass filter response;
the second filtering element provides one of a high-pass and a bandpass filter response;
the third filtering element provides a notch filter response; and
the fourth filtering element provides one of a high-pass or a bandpass filter response.

11. A method of operating radio frequency (RF) filtering circuitry comprising:
in a first carrier aggregation mode, operating switching circuitry in the RF filtering circuitry to couple a first filtering element between a common node and a first input/output node and couple a second filtering element between the common node and a second input/output node, wherein the first filtering element is configured to pass RF signals within a first RF frequency band while attenuating RF signals within a second RF frequency band and the second filtering element is configured to pass RF signals within a first portion of the second RF frequency band while attenuating RF signals within the first RF frequency band and RF signals within a second portion of the second RF frequency band;
in a second carrier aggregation mode, operating the switching circuitry in the RF filtering circuitry to couple a third filtering element between the common node and the first input/output node and couple a fourth filtering element between the common node and the second input/output node, wherein the third filtering element is configured to attenuate RF signals within the second portion of the second RF frequency band while passing RF signals within the first RF frequency band and RF signals within the first portion of the second RF frequency band; and
in a third carrier aggregation mode, operating the switching circuitry in the RF filtering circuitry to couple the third filtering element between the common node and a third input/output node and couple the fourth filtering element between the common node and the second input/output node.

12. The method of claim 11 further comprising:
in a non-carrier aggregation mode, operating the switching circuitry in the RF filtering circuitry to couple the common node directly to one of the first input/output node and the second input/output node.

13. The method of claim 12 wherein:
the first filtering element provides a low-pass filter response;
the second filtering element provides one of a high-pass filter response and a bandpass filter response;
the third filtering element provides a notch filter response; and
the fourth filtering element provides one of a high-pass filter response and a bandpass filter response.

14. The method of claim 12 wherein:
in the first carrier aggregation mode, the RF filtering circuitry is configured to isolate RF receive signals within the first RF frequency band from RF receive signals within the first portion of the second RF frequency band, separately delivering the RF receive signals within the first RF frequency band to the first input/output node and the RF receive signals within the first portion of the second RF frequency band to the second input/output node;
in the second carrier aggregation mode, the RF filtering circuitry is configured to isolate RF receive signals within the first RF frequency band from RF receive signals within the second portion of the second RF frequency and, separately delivering the RF receive signals within the first RF frequency band to the first input/output node and the RF receive signals within the second portion of the second RF frequency band to the second input/output node; and
in the third carrier aggregation mode, the RF filtering circuitry is configured to isolate RF receive signals within the first portion of the second RF frequency band from RF receive signals within the second portion of the second RF frequency band, separately delivering the RF receive signals within the first portion of the second RF frequency band to the third input/output node and the RF receive signals within the second portion of the second RF frequency band to the second input/output node.

15. The method of claim 14 wherein:
the first filtering element provides a low-pass filter response;
the second filtering element provides one of a high-pass filter response and a bandpass filter response;
the third filtering element provides a notch filter response; and
the fourth filtering element provides one of a high-pass filter response and a bandpass filter response.

16. The method of claim 14 wherein:
the first RF frequency band includes the frequencies between 1710 MHz and 2200 MHz;
the first portion of the second RF frequency band includes the frequencies between 2496 MHz and 2700 MHz; and
the second portion of the second RF frequency band includes the frequencies between 2300 MHz and 2400 MHz.

17. The method of claim 16 wherein:
the first filtering element provides a low-pass filter response;
the second filtering element provides one of a high-pass filter response and a bandpass filter response;
the third filtering element provides a notch filter response; and
the fourth filtering element provides one of a high-pass filter response and a bandpass filter response.

18. The method of claim 11 wherein:
in the first carrier aggregation mode, the RF filtering circuitry is configured to isolate RF receive signals within the first RF frequency band and from RF receive signals within the first portion of the second RF frequency band, separately delivering the RF receive signals within the first RF frequency band to the first input/output node and the RF receive signals within the first portion of the second RF frequency band to the second input/output node;
in the second carrier aggregation mode, the RF filtering circuitry is configured to isolate RF receive signals within the first RF frequency band from RF receive signals within the second portion of the second RF frequency and, separately delivering the RF receive signals within the first RF frequency band to the first input/output node and the RF receive signals within the second portion of the second RF frequency band to the second input/output node; and
in the third carrier aggregation mode, the RF filtering circuitry is configured to isolate RF receive signals within the first portion of the second RF frequency band from RF receive signals within the second portion of the second RF frequency band, separately delivering the RF receive signals within the first portion of the second RF frequency band to the third input/output node and the RF receive signals within the second portion of the second RF frequency band to the second input/output node.

19. The method of claim 11 wherein:
the first filtering element provides a low-pass filter response;
the second filtering element provides one of a high-pass filter response and a bandpass filter response;
the third filtering element provides a notch filter response; and
the fourth filtering element provides one of a high-pass filter response and a bandpass filter response.

20. The method of claim 11 wherein:
the first RF frequency band includes the frequencies between 1710 MHz and 2200 MHz;
the first portion of the second RF frequency band includes the frequencies between 2496 MHz and 2700 MHz; and
the second portion of the second RF frequency band includes the frequencies between 2300 MHz and 2400 MHz.

\* \* \* \* \*